United States Patent
Goyez et al.

(10) Patent No.: US 11,267,559 B2
(45) Date of Patent: *Mar. 8, 2022

(54) BRAKING SYSTEM ARCHITECTURE FOR AIRCRAFT

(71) Applicant: SAFRAN LANDING SYSTEMS, Velizy-Villacoublay (FR)

(72) Inventors: Brian Goyez, Moissy-Cramayel (FR); Dominique Onfroy, Moissy-Cramayel (FR); Olivier Frey, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 46 days.

This patent is subject to a terminal disclaimer.

(21) Appl. No.: 16/805,087

(22) Filed: Feb. 28, 2020

(65) Prior Publication Data

US 2020/0198778 A1 Jun. 25, 2020

Related U.S. Application Data

(63) Continuation of application No. 15/853,408, filed on Dec. 22, 2017, now Pat. No. 10,604,240.

(30) Foreign Application Priority Data

Dec. 23, 2016 (FR) ...................... 1663331

(51) Int. Cl.
*B64C 25/44* (2006.01)
*B60T 13/74* (2006.01)
(Continued)

(52) U.S. Cl.
CPC .............. *B64C 25/44* (2013.01); *B60T 8/172* (2013.01); *B60T 8/1703* (2013.01); *B60T 8/325* (2013.01);
(Continued)

(58) Field of Classification Search
CPC ....... B64C 25/44; B60T 8/1703; B60T 8/172; B60T 8/825; B60T 13/741; F26D 65/18; F16D 2121/24
(Continued)

(56) References Cited

U.S. PATENT DOCUMENTS 9,611,035 B2 4/2017 Iordanidis et al.
10,604,240 B2 * 3/2020 Goyez .................... B64C 25/44
(Continued)

FOREIGN PATENT DOCUMENTS

EP 2824809 A2 1/2015
EP 2878501 A1 6/2015

OTHER PUBLICATIONS

Rapport de Recherche Préliminaire / Opinion Écrite sur la Brevetabilité de l'Invention, dated Aug. 30, 2017, issued in corresponding French Application No. 1663331, filed Dec. 23, 2016, 7 pages.

*Primary Examiner* — Gertrude Arthur Jeanglaude
(74) *Attorney, Agent, or Firm* — Christensen O'Connor Johnson Kindness PLLC

(57) ABSTRACT

A braking system architecture for aircraft, the architecture comprising: a brake including friction members and electromechanical actuators for exerting a braking torque on the wheel; a computer situated in the fuselage of the aircraft and arranged to produce first control signals; and a junction box situated on the undercarriage, the junction box being connected to the computer and to the electromechanical actuators, the junction box being configured to receive the first control signals and to use the first control signals to produce second control signals for application to the electromechanical actuators in order to control the electromechanical actuators.

2 Claims, 3 Drawing Sheets

(51) Int. Cl.
  *B60T 8/17* (2006.01)
  *B60T 8/172* (2006.01)
  *B60T 8/32* (2006.01)
  *F16D 65/18* (2006.01)
  *F16D 121/24* (2012.01)

(52) U.S. Cl.
  CPC ............ *B60T 13/741* (2013.01); *F16D 65/18* (2013.01); *F16D 2121/24* (2013.01)

(58) Field of Classification Search
  USPC .......................................................... 701/3
  See application file for complete search history.

(56) References Cited

U.S. PATENT DOCUMENTS

| | | |
|---|---|---|
| 2002/0050372 A1 | 5/2002 | Lee |
| 2005/0110339 A1 | 5/2005 | Kolberg |
| 2011/0226569 A1 | 9/2011 | Devlieg |
| 2015/0015127 A1 | 1/2015 | Nierlich et al. |

\* cited by examiner

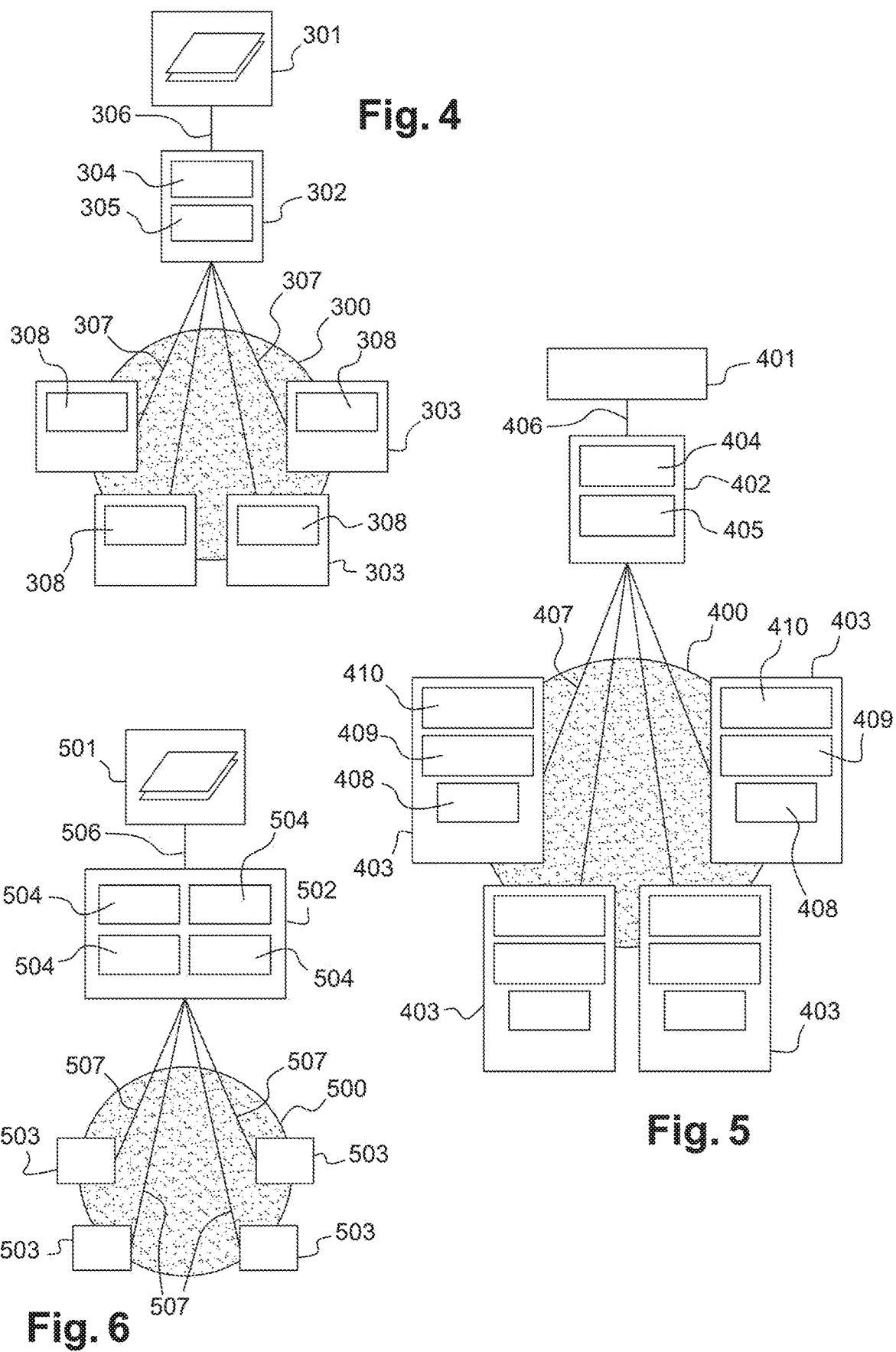

BRAKING SYSTEM ARCHITECTURE FOR AIRCRAFT

CROSS-REFERENCES TO RELATED APPLICATIONS

This application is a continuation of U.S. patent application Ser. No. 15/853,408, filed on Dec. 22, 2017, which claims the benefit of French Application No. 1663331, filed on Dec. 23, 2016, all the disclosures of which are incorporated by reference herein.

TECHNICAL FIELD

Embodiments of the present disclosure relate to the field of braking system architectures for aircraft.

BACKGROUND

With reference to FIG. 1, a known centralized architecture for an electric aircraft braking system comprises a plurality of brakes 1, each serving to brake a wheel of an undercarriage of the aircraft.

Each brake 1 has four electromechanical braking actuators 2, which are grouped together in two distinct groups of two electromechanical actuators 2. The two electromechanical actuators 2 of each distinct group are connected to the same computer 3 situated in the fuselage of the aircraft, above the undercarriage.

The electric motor of each electromechanical actuator 2 receives three-phase electrical power from the computer 3 to which the electromechanical actuator 2 is connected, and each electromechanical actuator 2 transmits measurements of a servo-control parameter to the computer 3, e.g. measurements of the angular position of the rotor of the electric motor. The computers 3 implement functions of monitoring and controlling the electromechanical actuators 2, and also functions of generating power by making use of inverters.

It can be seen that that centralized architecture requires the use of at least ten electric wires per electromechanical actuator 2: three power supply wires 4 for the three phases for powering the electric motor, four communication wires 5 for returning the measurements of the angular position of the rotor of the electric motor to a centralized computer 3, and two power supply wires and a ground wire (not shown in FIG. 1) for controlling a member that blocks the electromechanical actuator 2 so as to act as a parking brake.

These electric wires are integrated in harnesses that run from the fuselage of the aircraft to the brake 1 and that are therefore bulky and heavy. The long length of the harnesses conveying the power supply wires 4 (and thus conveying the currents powering the electric motors) requires the computers 3 to incorporate common mode filter circuits. The filter circuits add weight, complexity, and cost to the computers 3 and thus to the braking system.

SUMMARY

In accordance with an aspect of the present disclosure, a braking system architecture for aircraft is provided. In an embodiment, the architecture comprises:

a brake for braking a wheel of an undercarriage of the aircraft, the brake including friction members and electromechanical actuators for applying a braking force against the friction members and thereby exerting a braking torque on the wheel;

a computer situated in the fuselage of the aircraft and arranged to produce first control signals; and a junction box situated on the undercarriage, the junction box being connected to the computer and to the electromechanical actuators, the junction box being arranged to receive the first control signals, the junction box is configured to use the first control signals to produce second control signals for application to the electromechanical actuators in order to control the electromechanical actuators. In an embodiment, the junction box employs an electrical processor means or processing circuit for using the first control signals to produce second control signals for application to the electromechanical actuators in order to control the electromechanical actuators.

Using the junction box makes it possible to mutualize generating the second control signals from the first control signals, thereby reducing the number of cables extending from the fuselage of the aircraft to the brake. The number of components for performing functions is also reduced, since they can be mutualized in the junction box, thereby reducing the weight and the complexity of the braking system, and improving its reliability.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 shows a braking system architecture according to a third embodiment of the disclosure;

FIG. 5 shows a braking system architecture according to a fourth embodiment of the disclosure;

FIG. 6 shows a braking system architecture according to a fifth embodiment of the disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In these examples, embodiments are implemented on an aircraft that has a plurality of main undercarriages, each carrying a plurality of "braked" wheels, i.e. a plurality of wheels each fitted with a brake for braking the aircraft. The present disclosure relates to a single braked wheel; however the disclosure naturally applies in the same manner to all or some of the braked wheels of the aircraft.

Figure 1:
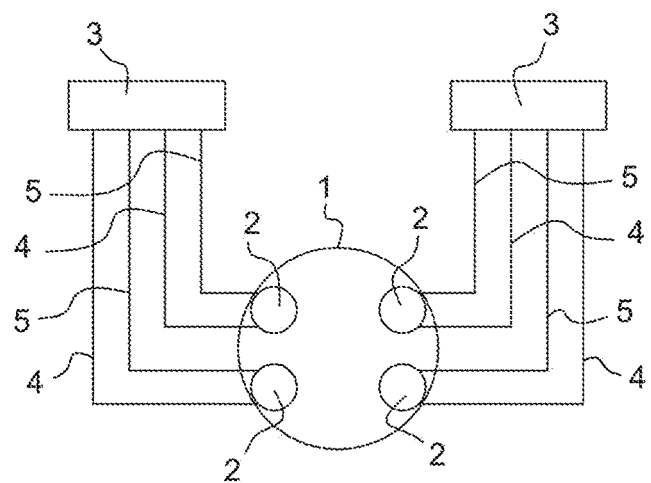
FIG. 1 shows a prior art braking system architecture.
Figure 2:
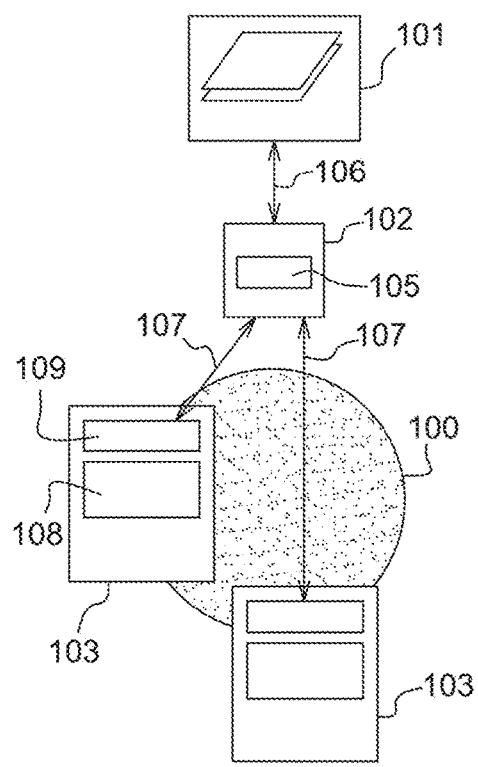
FIG. 2 shows a braking system architecture according to a first embodiment of the disclosure.

With reference to FIG. 2, a braking system architecture for aircraft according to a first embodiment of the disclosure includes a brake 100 for braking a wheel of the aircraft, a computer 101, and a junction box 102. The brake 100 includes four electromechanical braking actuators 103 (only two electromechanical actuators 103 are shown in FIG. 2). The computer 101, which is integrated in an avionics network, is positioned in a bay situated in the fuselage of the aircraft. The junction box 102 is situated on the undercarriage, close to the brake. The junction box 102 includes electrical processor means 105 comprising a digital switch, for example.

The computer 101 and the junction box 102 are connected together by a first digital bus 106 having a first number of wires. The junction box 102 is connected to each electromechanical actuator 103 by a second digital bus 107 having a second number of wires.

In addition to the four electromechanical actuators 103, the brake 100 includes an actuator-carrier on which there are mounted the four electromechanical actuators 103 and friction members, for example, a stack of carbon disks. The four electromechanical actuators 103 are used to apply a braking force against the stack of carbon disks and thereby exert a braking torque on the wheel, slowing down rotation of the wheel, and thus braking the aircraft when it is on the ground.

Each electromechanical actuator 103 includes a body fastened to the actuator-carrier, a pusher, and a blocking member adapted to block the pusher in position. An electric motor, a power module 108, and a digital communication module 109 are associated with or integrated inside the body of each electromechanical actuator 103. The pusher is actuated by the electric motor in order to slide and apply the braking force against the stack of carbon disks.

The power module 108 serves to generate alternating current (AC) power that flows in the three phases of the electric motor when it is appropriate to actuate the pusher and thus brake the wheel, and when it is appropriate to withdraw the pusher in order to stop braking the wheel. For this purpose, the power module 108 in some embodiments includes an inverter comprising a plurality of switches that are controlled so as to transform a direct current (DC) power supply voltage into a three-phase AC voltage used for generating the power supply for the electric motor.

The DC power supply voltages received by the power modules 108 of the four electromechanical actuators 103 of the brake 100 come from one or more power supply units situated in the fuselage of the aircraft, and not shown in FIG. 2.

The computer 100 is configured to produce first control signals. The junction box 102 is configured and arranged to receive the first control signals and to produce second control signals. For example, the electrical processor means 105 of the junction box are configured and arranged to use the first control signals to produce second control signals for application to the electromechanical actuators 103 in order to control of the electromechanical actuators 103.

In this example, the first control signals and the second control signals comprise digital control signals for the electric motors of the electromechanical actuators 103. The digital control signals, as produced by the computer 100, are distributed to the digital communication modules 109 of the electromechanical actuators 103 via the digital switch of the electrical processor means 105 of the junction box 102.

The digital communication module 109 of each mechanical actuator 103 transforms the digital control signals that are sent thereto into inverter control signals and transmits the inverter control signals to the power module 108 and thus to the inverter of the power module 108. The inverter control signals control the switches of the inverter.

The digital communication modules 109 of the four electromechanical actuators 103, and the digital switch of the electrical processor means 105 of the junction box 102 are thus interconnected in order to form a digital network.

It should be observed that digital signals may also be returned from the wheel to the computer 101 and thus to the avionics network, via the second digital buses 107 and the first digital bus 106. The second digital buses 107 and the first digital bus 106 are thus bidirectional buses.

By way of example, the digital signals comprise digital measurement signals produced by a data concentrator situated on the wheel. The data concentrator itself receives analog measurement signals produced by sensors situated on the wheel, and it generates the digital measurement signals on the basis of the analog digital signals. The sensors measure parameters representative of a state of the wheel, e.g. a temperature of the brake, a pressure of the tire of the wheel, etc.

The digital signals may also comprise digital measurement signals produced by sensors associated with the electric motors of the electromechanical actuators 103. These digital measurement signals serve to monitor the electrical motors of the electromechanical actuators. By way of example, the sensors associated with the electric motors of the mechanical actuators 103 measure angular positions or speeds of the rotors of the electric motors, the power supply currents consumed by the electric motors, etc.

It should be observed at this point that a junction box situated on the undercarriage is conventionally present in traditional braking system architectures. The usual role of the junction box is to take cabling coming from a harness running along the length of the undercarriage and distribute it to each of the electromechanical actuators in order to deliver their power supply voltages to the electromechanical actuators.

In the present disclosure, the existing junction box is thus provided with additional functions that are novel and innovative in order to obtain the junction box 102 without significantly modifying the mechanical interfaces of an existing junction box. These functions do not require additional equipment, since the junction box is present in traditional architectures.

Figure 3:
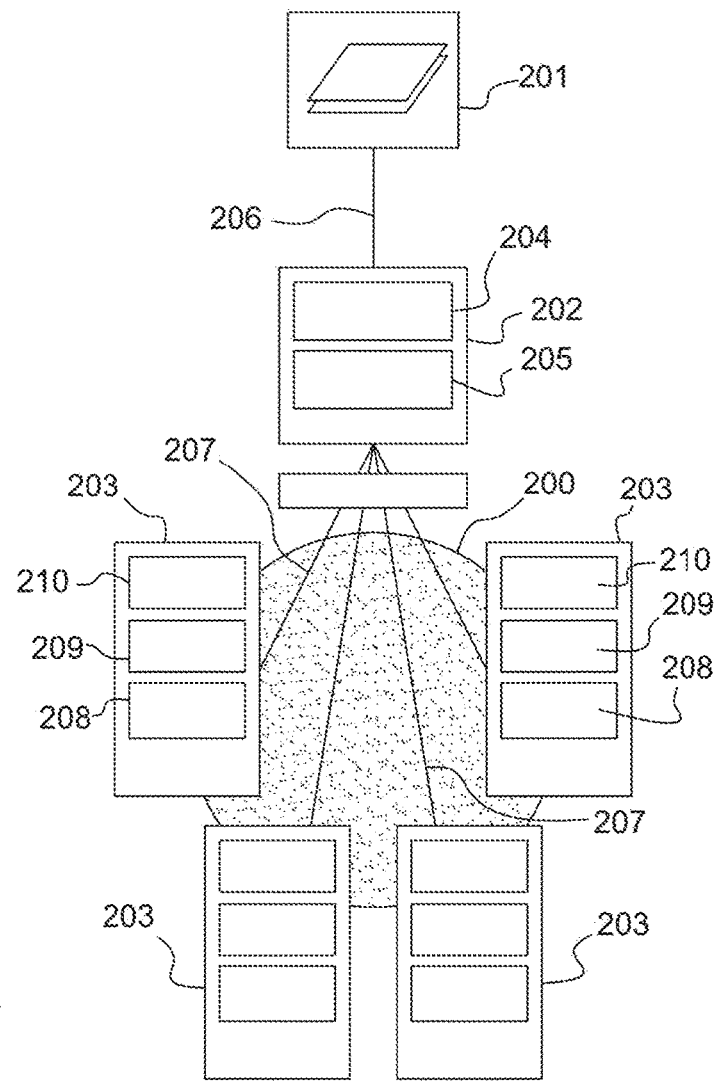
FIG. 3 shows a braking system architecture according to a second embodiment of the disclosure.

With reference to FIG. 3, a braking system architecture for aircraft according to a second embodiment of the disclosure includes a brake 200 for braking a wheel of the aircraft, a computer 201, and a junction box 202. The brake 200 includes four electromechanical braking actuators 203. The computer 201, which is integrated in an avionics network, is positioned in a bay situated in the fuselage of the aircraft.

The junction box 202 is situated on the undercarriage, close to the brake 200. The junction box 202 includes first electrical processor means 204 and second electrical processor means 205. The first electrical processor means 204 are arranged to perform a function of monitoring and controlling the electric motors of the four electromechanical actuators 203. The second electrical processor means 205 are arranged to perform a function of monitoring and controlling the electric motors of the four electromechanical actuators 203.

The computer 201 and the junction box 202 are connected together by a first harness 206 having a first number of wires. The first harness 206 includes a first digital bus. The junction box 202 is connected to each electromechanical actuator 203 by a second harness 207 having a second number of wires. Each second harness 207 includes a second digital bus.

Each electromechanical actuator 203 includes a body fastened to the actuator-carrier, a pusher, and a blocking member adapted to block the pusher in position. An electric motor, a power module 208, a first digital communication module 209, and a second digital communication module 210 are associated with or integrated inside the body of each electromechanical actuator 203.

The power module 208 serves to generate AC power that flows in the three phases of the electric motor when it is appropriate to actuate the pusher and thus brake the wheel, and when it is appropriate to withdraw the pusher in order to stop braking the wheel. For this purpose, the power module 203 includes, for example, an inverter comprising a plurality of switches that are controlled so as to transform a DC power supply voltage into a three-phase AC voltage used for generating the power supply for the electric motor. The power supply voltages received by the power modules 208 of the four electromechanical actuators 203 of the brake come from one or more power supply units situated in the fuselage of the aircraft, and not shown in FIG. 3.

The computer 201 is configured to produce first control signals. The junction box 202 is configured and arranged to receive the first control signals and to produce second control signals. For example, the first electrical processor means 204 and the second electrical processor means 205 of the junction box 202 are configured and arranged to use the first control signals to produce second control signals for application to the electromechanical actuators 203 in order to control of the electromechanical actuators 203.

In this example, the first control signals comprise digital braking control signals. In this example, the second control signals comprise digital control signals for the electric motors of the electromechanical actuators.

The first electrical processor means 204 of the junction box 202 thus use the digital braking control signals to generate digital control signals for the electric motors of the electromechanical actuators 203 for the first digital communication module 209 of each electromechanical actuator 203.

The second electrical processor means 205 of the junction box 202 thus use the digital braking control signals to generate digital control signals for the electric motors of the electromechanical actuators 203 for the second digital communication module 210 of each electromechanical actuator 203.

The first digital communication module 209 and the second digital communication module 210 of an electromechanical actuator 203 transmit inverter control signals to the power module 208 and thus to the inverter of the power module 208 of the electromechanical actuator 203, which inverter control signals are generated from the digital control signals for the electric motors. The inverter control signals control the switches of the inverter.

It should be observed that the use of first electrical processor means 204 and of second electrical processor means 205 in the junction box 202, and of the first digital communication module 209 and of the second digital communication module 210 in each electromechanical actuator 203, makes it possible in a simple manner to obtain two dissimilar control paths, without multiplying the number of components and without the design of the components being too complex. The braking system architecture in the second embodiment of the disclosure thus presents high levels of safety and reliability.

With reference to FIG. 4, a braking system architecture for aircraft according to a third embodiment of the disclosure includes a brake 300 for braking a wheel of the aircraft, a computer 301, and a junction box 302. The brake 300 includes four electromechanical braking actuators 303. The computer 300, which is integrated in an avionics network, is positioned in a bay situated in the fuselage of the aircraft.

The junction box 302 is situated on the undercarriage, close to the brake. The junction box 302 includes first electrical processor means 304 and second electrical processor means 305. The first electrical processor means 304 comprise a first digital-to-analog converter. The second electrical processor means 305 comprise a second digital-to-analog converter.

The computer 300 and the junction box 302 are connected together by a first harness 306 having a first number of wires. The junction box 302 is connected to each electromechanical actuator 303 by a second harness 307.

Each electromechanical actuator 303 includes a body fastened to the actuator-carrier, a pusher, and a blocking member adapted to block the pusher in position. An electric motor and a module 308 are associated with or integrated inside the body of each electromechanical actuator 303.

The power module 308 serves to generate AC power that flows in the three phases of the electric motor when it is appropriate to actuate the pusher and thus brake the wheel, and when it is appropriate to withdraw the pusher in order to stop braking the wheel. For this purpose, the power module 308 includes an inverter comprising a plurality of switches that are controlled so as to transform a DC power supply voltage into a three-phase AC voltage used for generating the power supply for the electric motor.

The power supply voltages received by the power modules 308 of the four electromechanical actuators 303 of the brake come from one or more power supply units situated in the fuselage of the aircraft, and not shown in FIG. 4.

The computer 301 is configured to produce first control signals. The junction box 302 is configured and arranged to receive the first control signals and to produce second control signals. For example, the first electrical processor means 304 and the second electrical processor means 305 of the junction box 302 are configured and arranged to use the first control signals to produce second control signals for application to the electromechanical actuators 303 in order to control of the electromechanical actuators 303.

In this example, the first control signals comprise digital control signals for the electric motors of the electromechanical actuators 303. In this example, the digital control signals implement a control function by pulse width modulation.

The digital control signals, produced by the computer 301 are transmitted to the first electrical processor means 304 and to the second electrical processor means 305. The first digital-to-analog converter of the first electrical processor means 304 converts the digital control signals into analog signals for controlling the inverter. The second digital-to-analog converter of the second electrical processor means 305 also converts the digital control signals into analog signals for controlling the inverter. In this example, the second control signals thus comprise the analog control signals for the inverter.

The power module 308 of each electromechanical actuator 303 thus receives the analog inverter control signals and controls the inverter of the power module 308 by these analog inverter control signals.

Advantageously, the first electrical processor means 304 include a first analog-to-digital converter, and the second electrical processor means 305 include a second analog-to-digital converter. The analog measurement signals may be analog measurement signals produced by sensors situated on the wheel, or analog measurement signals produced by sensors associated with the electric motors of the electromechanical actuators 303. By way of example, the sensors associated with the electric motors of the mechanical actuators 303 measure angular positions or speeds of the rotors of the electric motors, or else the power supply currents consumed by the electric motors.

With reference to FIG. 5, a braking system architecture for aircraft according to a fourth embodiment of the disclosure includes a brake 400 for braking a wheel of the aircraft, a computer 401, and a junction box 402. The brake includes four electromechanical braking actuators 403. The computer 401, which is integrated in an avionics network, is positioned in a bay situated in the fuselage of the aircraft.

The junction box 402 is situated on the undercarriage, close to the brake 400. The junction box 402 includes first electrical processor means 404 and second electrical processor means 405. The first electrical processor means 404 are configured and arranged to perform a braking control function. The second electrical processor means 405 are also configured and arranged to perform a braking control function.

The computer 401 and the junction box 402 are connected together by a first harness 406 having a first digital bus. The junction box 402 is connected to each electromechanical actuator 403 by a second harness 407 having a second digital bus.

Each electromechanical actuator 403 includes a body fastened to the actuator-carrier, a pusher, and a blocking member adapted to block the pusher in position. An electric motor, a power module 408, a first digital communication module 409, and a second digital communication module 410 are associated with or integrated inside the body of each electromechanical actuator 403.

The power module 408 serves to generate AC power that flows in the three phases of the electric motor when it is appropriate to actuate the pusher and thus brake the wheel, and when it is appropriate to withdraw the pusher in order to stop braking the wheel. For this purpose, the power module 408 includes an inverter comprising a plurality of switches that are controlled so as to transform a DC power supply voltage into a three-phase AC voltage used for generating the power supply for the electric motor.

The power supply voltages received by the power modules 408 of the four electromechanical actuators 403 of the brake 400 come from one or more power supply units situated in the fuselage of the aircraft, and not shown in FIG. 5.

The computer 401 is configured to produce first control signals. The junction box 402 is arranged to receive the first control signals and to produce second control signals. For example, the first electrical processor means 404 and the second electrical processor means 405 of the junction box 402 are configured and arranged to use the first control signals to produce second control signals for application to the electromechanical actuators 403 in order to control of the electromechanical actuators 403.

In this example, the first control signals comprise a braking setpoint. The first electrical processor means 404 of the junction box 402 transform the braking setpoint into digital braking control signals. The second electrical processor means 405 of the junction box 402 transform the braking setpoint into digital braking control signals. In this example, the second control signals thus comprise digital braking control signals.

The first digital communication module 409 and the second digital communication module 410 acquire the digital braking control signals, and each of them performs a function of monitoring and controlling the electric motor. The monitoring and control function produces inverter control signals from the digital braking control signals. The inverter control signals control the switches of the inverter.

It should be observed that the use of first electrical processor means 404 and of second electrical processor means 405 in the junction box 402, and the use of the first digital communication module 409 and of the second digital communication module 410 in each electromechanical actuator 403, makes it possible in a simple manner to obtain two dissimilar control paths, without multiplying the number of components and without the design of the components being too complex. The braking system architecture in the fourth embodiment of the disclosure thus presents high levels of safety and reliability.

With reference to FIG. 6, a braking system architecture for aircraft according to a fifth embodiment of the disclosure includes a brake 500 for braking a wheel of the aircraft, a computer 501, and a junction box 502. The brake includes four electromechanical braking actuators 503. The computer 501, which is integrated in an avionics network, is positioned in a bay situated in the fuselage of the aircraft.

The junction box 502 is situated on the undercarriage, close to the brake 500. The junction box 502 includes electrical processor means comprising four power converters 504. Each power converter 504 comprises an inverter.

The computer 501 and the junction box 502 are connected together by a first harness 506. The junction box 502 is connected to each electromechanical actuator 503 by a second harness 507.

Each electromechanical actuator 503 includes a body fastened to the actuator-carrier, a pusher, and a blocking member adapted to block the pusher in position. An electric motor is associated with or integrated inside the body of each electromechanical actuator 503.

The computer 501 is configured to produce first control signals. The junction box 502 is configured and arranged to receive the first control signals and to produce second control signals. For example, the electrical processor means of the junction box 502 are configured and arranged to use the first control signals to produce second control signals for application to the electromechanical actuators 503 in order to control of the electromechanical actuators.

The first control signals comprise a DC power supply voltage generated by the computer 503 and transmitted to the junction box 502 via the first harness 506, together with inverter control signals. The DC power supply voltage is generated by the computer 503 from an on-board power supply source.

Each power converter 504 of the electrical processor means of the junction box 502 uses the DC power supply voltage and the inverter control signals to generate power supply currents for the electric motor of one of the electromechanical actuators 503. The second control signals thus comprise power supply currents for the electric motors of the electromechanical actuators 503.

It should be observed that the braking system architecture in the fifth embodiment serves to simplify the cabling, by taking a DC power supply voltage to the junction box rather than a three-phase power supply voltage.

Figure 7:
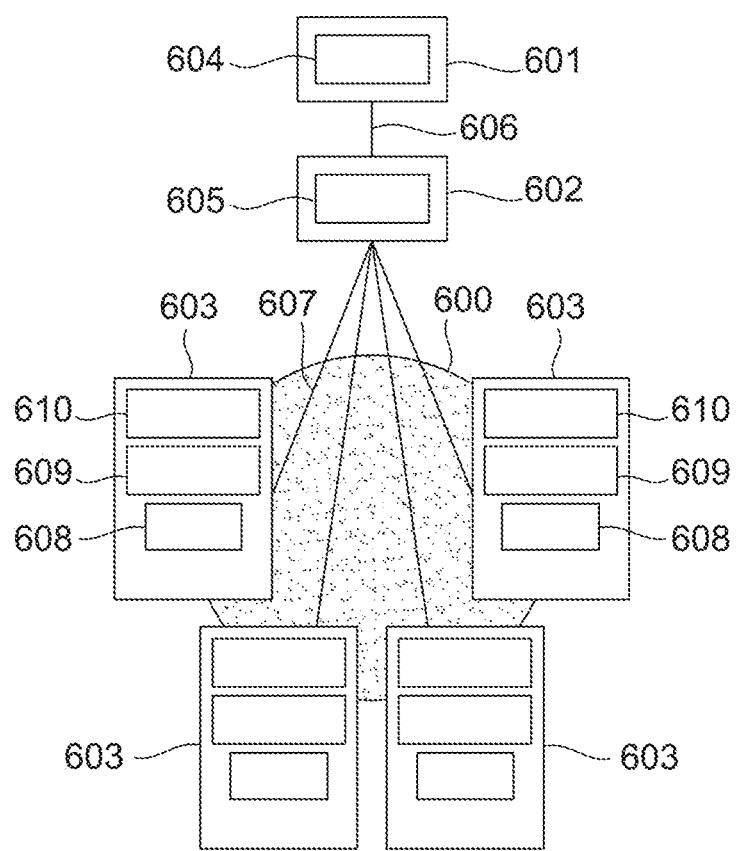
FIG. 7 shows a braking system architecture according to a sixth embodiment of the disclosure.

With reference to FIG. 7, a braking system architecture for aircraft according to a sixth embodiment of the disclosure includes a brake 600 for braking a wheel of the aircraft, a computer 601, and a junction box 602. The brake includes four electromechanical braking actuators 603. The computer 601, which is integrated in an avionics network, is positioned in a bay situated in the fuselage of the aircraft.

The computer 601 includes first electrical processor means 604. The first electrical processor means 604 are configured and arranged to perform a braking control function.

The junction box 602 is situated on the undercarriage, close to the brake 600. The junction box 602 includes second electrical processor means 605 comprising a digital switch, for example.

The computer 601 and the junction box 602 are connected together by a first harness 606 having a first digital bus. The junction box 602 is connected to the electromechanical actuators 603 by second harnesses 607, each having a second digital bus.

Each electromechanical actuator 603 includes a body fastened to the actuator-carrier, a pusher, and a blocking member adapted to block the pusher in position. An electric motor, a power module 608, a first digital communication module 609, and a second digital communication module 610 are associated with or integrated inside the body of each electromechanical actuator 603.

The power module 608 serves to generate AC power that flows in the three phases of the electric motor when it is appropriate to actuate the pusher and thus brake the wheel, and when it is appropriate to withdraw the pusher in order to stop braking the wheel. For this purpose, the power module 608 includes an inverter comprising a plurality of switches that are controlled so as to transform a DC power supply voltage into a three-phase AC voltage used for generating the power supply for the electric motor.

The power supply voltages received by the power modules 608 of the four electromechanical actuators 603 of the brake 600 come from one or more power supply units situated in the fuselage of the aircraft, and not shown in FIG. 7.

The computer 601 receives a braking setpoint. The first electrical processor means 604 of the computer 601 transform the braking setpoint into digital braking control signals. The first electrical processor means 604 produce first control signals. In this example, the first control signals comprise the digital braking control signals.

The junction box 602 is configured and arranged to receive the first control signals and to produce second control signals. For example, the second electrical processor means 605 of the junction box 602 are configured and arranged to use the first control signals to produce second control signals for application to the electromechanical actuators 603 in order to control of the electromechanical actuators 603.

The digital braking control signals, as produced by the computer 601, are distributed to the first digital communication module 609 and to the second digital communication module 610 of each electromechanical actuator 603 via the digital switch of the second electrical processor means 605 of the junction box 602.

In this example, the second control signals thus comprise the digital braking control signals.

The first digital communication module 609 and the second digital communication module 610 acquire the digital braking control signals, and each of them performs a function of monitoring and controlling the electric motor. The monitoring and control function produces inverter control signals from the digital braking control signals. The inverter control signals control the switches of the inverter.

Embodiments of the disclosure are not limited to the particular embodiments described above, but on the contrary, cover any variant coming within the ambit of the disclosure as defined by the claims.

In particular, it is perfectly possible to combine certain architectures with one another. For example, it is possible to use an architecture in which the junction box has processor means that generate both the control signals and the power supply phase currents for the electric motors.

It is also perfectly possible to use not one junction box, but a plurality of junction boxes. For example, it is possible to use an architecture in which a first junction box is connected to a first computer and to two first electromechanical actuators of the brake, and a second junction box is connected to a second computer and to two second electromechanical actuators of the brake.

In each architecture, it is possible to make provision for some number of components that is different from the numbers described. For example, in the first embodiment, provision may be made for each electromechanical actuator to have two digital communication modules, or in the second embodiment, provision may be made for each electromechanical actuator to have only one digital communication module, or indeed in the fifth embodiment, provision may be made for the processor means of the junction box to have two power converters, etc.

The present description relates to a certain number of functions performed in the junction box, and to a certain number of components integrated in the junction box. This description is not limiting in any way. The junction box could perform other functions (e.g. filtering, measuring, monitoring, etc. functions), and could include other components (e.g. filter components, sensors, etc.).

It should be observed that the computer mentioned herein may be positioned at any location within the fuselage of the aircraft. By way of example, the computer may be positioned in an avionics bay or close to the cockpit of the aircraft. In particular, with an architecture in accordance with the fourth embodiment of the disclosure, the computer could perfectly well be a "pedal box" that receives braking information from the pilot and that transforms it into a braking setpoint that is transmitted to the junction box.

In some embodiments disclosed herein, the electrical processor means includes circuitry for implementing the functionality described in the various embodiments herein. The electrical processor means in some embodiments includes an electrical processor for implementing the functionality described herein. In some of these embodiments, the electrical processor can be a digital switch, a digital to analog converter, a power converter, among other electrical components. Some of the embodiments of the electrical processor means may include, for example, logic for implementing the functionality described herein. This logic can be carried out by hardware, software, or a combination of hardware and software. In some embodiments, the logic can be carried out by analog circuitry, digital circuitry, and combinations thereof. In some embodiments, the logic can be carried out by a computer, a signal processor, a microprocessor, an ASIC, a field programmable gate array (FPGA), etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A braking system architecture for aircraft, the architecture comprising:
    a brake for braking a wheel of an undercarriage of the aircraft, the brake including friction members and electromechanical actuators for applying a braking force against the friction members and thereby exerting a braking torque on the wheel, each electromechanical actuator including a body having integrated therein an electric motor;
    a computer situated in the fuselage of the aircraft and arranged to produce first control signals; and
    a junction box situated on the undercarriage, the junction box being connected to the computer and to the electromechanical actuators, the junction box being configured and arranged to receive the first control signals, the junction box comprising electrical processor means configured and arranged to use the first control signals to produce second control signals for application to the electromechanical actuators in order to control the electromechanical actuators, the electrical processor means of the junction box including power converters, the first control signals comprising a power supply coming from an on-board power supply source and the second control signals comprising power supply currents for the electric motors.

2. A braking system architecture for aircraft, the architecture comprising:
    a brake adapted to brake a wheel of an undercarriage of the aircraft, the brake including friction members and electromechanical actuators for applying a braking force against the friction members to exert a braking torque on the wheel, each electromechanical actuator including a body having integrated therein an electric motor;
    a control circuit situated in the fuselage of the aircraft and arranged to produce first control signals; and
    a junction box situated on the undercarriage, the junction box being connected to the control circuit and to the electromechanical actuators, the junction box being configured and arranged to receive the first control signals, the junction box comprising a processing circuit configured and arranged to use the first control signals to produce second control signals for application to the electromechanical actuators in order to control the electromechanical actuators, the processing circuit of the junction box including power converters, the first control signals comprising a power supply coming from an on-board power supply source and the second control signals comprising power supply currents for the electric motors.

* * * * *